United States Patent
Pan et al.

(10) Patent No.: US 7,860,528 B2
(45) Date of Patent: Dec. 28, 2010

(54) MOBILE UNIVERSAL COMMUNICATION GATEWAY

(75) Inventors: James J. Pan, Cupertino, CA (US); Gustavo Nader, Ashburn, VA (US); Ali Tabassi, Great Falls, VA (US); Sunil Prasad, Ashburn, VA (US)

(73) Assignee: Nextel Communications Inc., Reston, VA (US)

( * ) Notice: Subject to any disclaimer, the term of this patent is extended or adjusted under 35 U.S.C. 154(b) by 483 days.

(21) Appl. No.: 11/447,170

(22) Filed: Jun. 6, 2006

(65) Prior Publication Data

US 2007/0281685 A1    Dec. 6, 2007

(51) Int. Cl.
*H04M 1/00* (2006.01)
(52) U.S. Cl. ............... 455/552.1; 455/432.2; 455/433; 370/328
(58) Field of Classification Search ............. 455/556.1, 455/555, 554.2, 554.1, 550.1, 552.1, 66.1, 455/525, 414.4, 41.2, 574, 414.1, 557, 445, 455/432.1, 432.2, 433, 436; 370/328, 329, 370/338, 315, 331
See application file for complete search history.

(56) References Cited

U.S. PATENT DOCUMENTS

| | | | |
|---|---|---|---|
| 2002/0039063 A1* | 4/2002 | Ritter | 340/5.53 |
| 2004/0029585 A1* | 2/2004 | Akgun et al. | 455/432.2 |
| 2004/0128310 A1* | 7/2004 | Zmudzinski et al. | 707/102 |
| 2004/0184466 A1* | 9/2004 | Chang et al. | 370/401 |
| 2004/0203387 A1* | 10/2004 | Grannan | 455/41.2 |
| 2005/0135299 A1* | 6/2005 | Bishop et al. | 370/328 |
| 2005/0136993 A1* | 6/2005 | Lilja et al. | 455/574 |
| 2006/0019666 A1* | 1/2006 | Tell et al. | 455/445 |
| 2006/0166705 A1* | 7/2006 | Seshadri et al. | 455/569.1 |
| 2007/0049339 A1* | 3/2007 | Barak et al. | 455/557 |
| 2007/0207767 A1* | 9/2007 | Reuss | 455/403 |
| 2007/0254709 A1* | 11/2007 | Higgins | 455/557 |
| 2008/0151101 A1* | 6/2008 | Tian et al. | 348/448 |

* cited by examiner

*Primary Examiner*—Jean A Gelin

(57) ABSTRACT

Systems and methods for a mobile universal communication gateway are provided. The mobile universal communication gateway can bridge a mobile station located in a personal area network with one or more wide area networks. The mobile universal communication gateway can select one or more backhaul communication links to the one or more wide area networks based on a variety of factors such as available bandwidth, access cost, traffic loads and the like. The mobile universal communication gateway can also include a non-volatile storage area to store information for mobile stations of the personal area network.

8 Claims, 4 Drawing Sheets

MOBILE UNIVERSAL COMMUNICATION GATEWAY

BACKGROUND OF THE INVENTION

Currently wireless communication networks can be provided as either macro networks or personal area networks. Macro networks include cellular networks provided by companies such as Sprint Nextel Corporation, Verizon Wireless, Cingular and the like. These networks employ licensed frequency bands for communications between mobile stations and the macro network. Personal area networks typically operate using unlicensed frequency bands, and at much lower power than that employed by macro networks.

Recently a number of mobile stations have been produced that can access both macro networks and personal area networks. These mobile stations include wireless telephones and notebook computers that are equipped with a separate radio system for accessing each type of network.

Recent advances in wireless communication technology now allow high bandwidth information to be provided over wireless communication networks. This information can require a large amount of processing by the receiving device, which increases the need for robust processors in mobile stations. This, in turn, rapidly depletes the battery of the mobile station. The high bandwidth needed for transmitting this information can also reduce the coverage distance of wireless communication links to the macro network.

SUMMARY OF THE INVENTION

Exemplary embodiments of the present invention are directed to a mobile universal communication gateway. The mobile universal communication gateway includes wireless and/or wired interfaces for mobile stations located in a personal area network and for communicating with one or more wide area networks. Accordingly, the mobile universal communication gateway can act as an intermediary between a personal area network and one or more wide area networks. The mobile universal communication gateway can select one or more backhaul communication links with one or more wide area networks based on a variety of factors. These communication links can be wireless, wired, or a combination of wired and wireless. The mobile universal communication gateway can also include a non-volatile memory that can locally store frequently used information and/or multimedia information for mobile stations of the personal area network. The processor of the mobile universal communication gateway can pre-process information for the mobile stations in the personal area network, such as video and/or audio decoding and/or the like.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
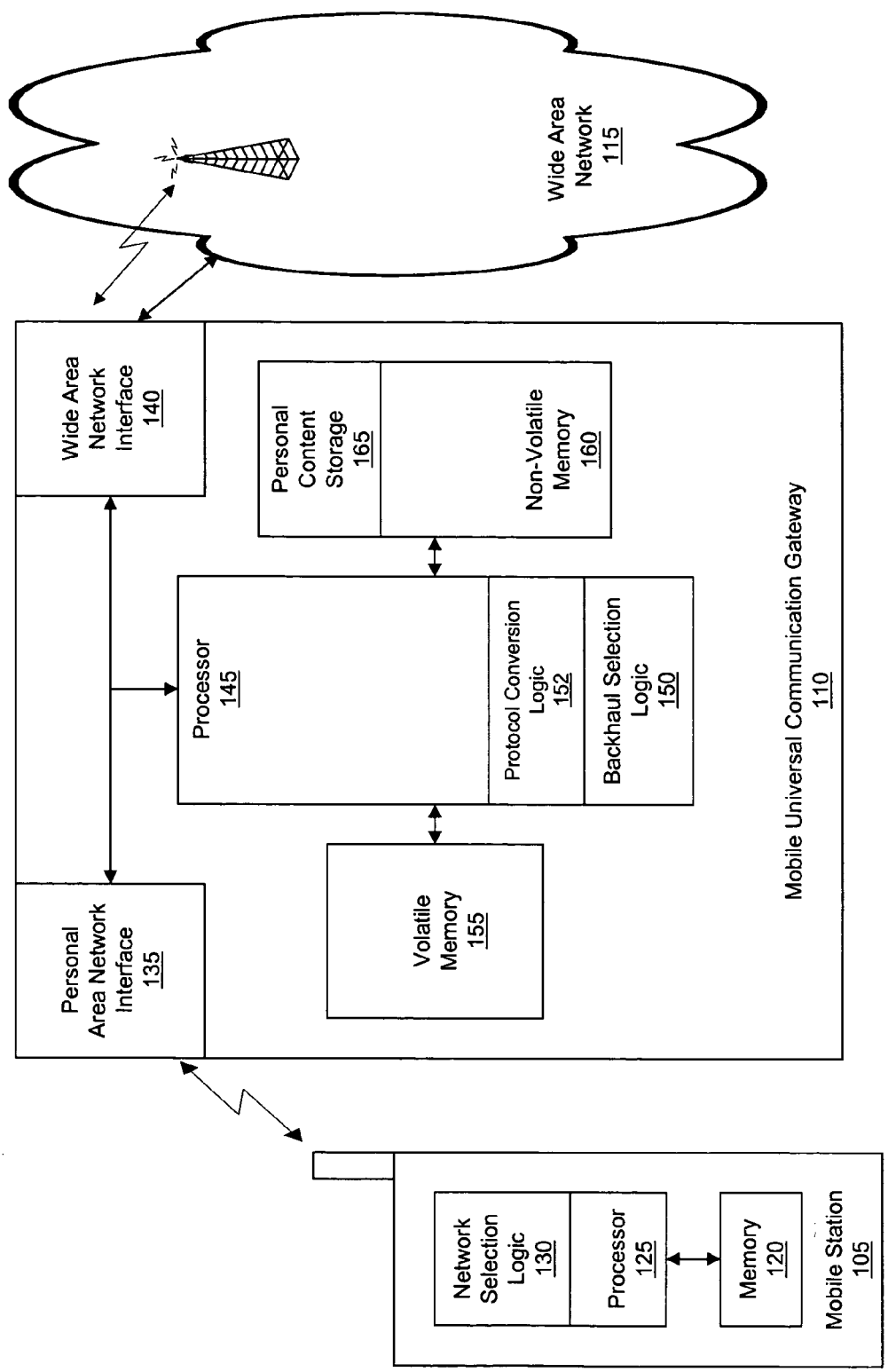
FIG. 1 is a block diagram of an exemplary system in accordance with the present invention.

FIG. 1 is a block diagram of an exemplary system in accordance with the present invention. The system includes mobile station 105, personal mobile universal communication gateway 110 and wide area network 115. Personal mobile universal communication gateway can be associated with one or more mobile stations, such that only those mobile stations associated with the gateway can access the gateway. For example, personal mobile universal communication gateway 110 can be arranged in an automobile and the gateway will only allow an owner of the automobile, or others authorized by the owner, to connect to wide area network 115 via the gateway. Personal mobile universal communication gateway 110 can also be carried by a user to any location and only those authorized by the gateway's owner and/or user will be allowed to access the gateway. If desired, a network operator providing personal mobile universal communication gateway 110 can allow other mobile stations to communicate with the gateway as a way to reduce backhaul costs, with the network operator compensating the owner of the gateway for the bandwidth used by these other mobile stations.

Mobile station 105 includes memory 120 and processor 125. Processor 125 includes network selection logic 130, which selects from available networks for transmitting communications from the mobile station. Network selection logic 130 can show a preference for communicating with personal mobile universal communication gateway 110 over wide area network 115 such that it will only communicate directly with the wide area network when the personal mobile universal communication gateway is unavailable. Memory 120 can be any type of memory including read only memory, random access memory, volatile memory non-volatile memory and/or the like. Processor 125 can be a microprocessor, field programmable gate array (FPGA), application specific integrated circuit (ASIC), and/or the like. When processor 125 is a microprocessor, network selection logic 130 can be machine-readable code loaded from memory 120.

Personal mobile universal communication gateway 110 is designed as an intermediate device between mobile station 105 and one or more wide area networks. Because personal mobile universal communication gateway will typically be located closer to the mobile station than the mobile station is typically located with respect to base stations of a wide area network, the mobile station will require less transmission power for communicating with the personal mobile universal communication gateway. This reduces the drain on the battery of mobile station 105. In one exemplary embodiment personal mobile universal communication gateway can be, for example, a laptop computer without a screen. In this embodiment the high processing power and large batteries of laptop computers can be leveraged without the large battery drain caused by the typically laptop display. In other embodiments, however, the personal mobile universal communication gateway can be arranged as any type of device with the components and functionalities described below. Personal mobile universal communication gateway 110 can have a larger battery capacity and more physical space for advanced antenna installations compared to mobile station 105. This improves communication performance of the broadband backhaul communication links from the personal mobile universal communication gateway to wireless macro networks.

Personal mobile universal communication gateway 110 includes personal area network interface 135, wide area network interface 140, volatile memory 155 and non-volatile memory 160 all of which are coupled to processor 145. Processor 145 includes backhaul selection logic 150 and protocol conversion logic 152, which will be described in more detail below in connection with FIGS. 3a and 3b. Processor 145 can be a microprocessor, field programmable gate array (FPGA), application specific integrated circuit (ASIC), and/or the like. When processor 145 is a microprocessor, backhaul selection logic 150 and protocol conversion logic 152 can be machine-readable code loaded from memory 155 or 160. Processor 145 can perform resource intensive tasks for mobile station 105 such as audio and/or video decoding, or any other resource intensive task. Memory 160 includes personal content storage area 165.

Personal area network interface 135 can include one or more wireless network interfaces for communicating with mobile stations in a personal area network, such interfaces including a wireless fidelity (WiFi), Bluetooth and/or other short range communications interface. The interface can also include one or more hard-wired interfaces such as an Ethernet, digital subscriber line (DSL), data over cable service interface specification (DOCSIS), passive optical network (PON), plain old telephone system (POTS) dial-up and/or the like interface. The interface can also include one or more wireless wide area network interfaces such as a GSM, iDEN, CDMA, WCDMA, TD-SCDMA, EV-DO, WiMax, satellite and/or the like interface. When wide area network techniques are employed for the personal area network interface 135, personal mobile universal communication gateway 110 and mobile station 105 operate at lower power levels than typically used for wide area network techniques due to the relatively close proximity of these devices compared to the typical distance between mobile stations and base stations in wide area networks. Accordingly, personal area network interface can operate over any licensed frequency band or unlicensed frequency band (e.g., the 902-928 MHz, 2400-2483 MHz, 5725-5780 MHz industrial-scientific-medical (ISM) frequency bands or the 5.15-5.35 GHz and 5.75-5.825 GHz unlicensed national information infrastructure (U-NII) frequency bands).

As illustrated in FIG. 1, wide area network interface 140 can include interfaces for communication with wide area network 115 over wired and/or wireless communication links. Specifically, wide area network interface 140 can one or more hard-wired interfaces such as an Ethernet, digital subscriber line (DSL), data over cable service interface specification (DOCSIS), passive optical network (PON), plain old telephone system (POTS) dial-up and/or the like interface. The interface can also include one or more wireless wide area network interfaces such as a GSM, iDEN, CDMA, WCDMA, TD-SCDMA, EV-DO, WiMax, satellite and/or the like interface.

Personal mobile universal communication gateway 110 can include one or more antennas coupled to personal area network interface 135 and wide area network interface 140. These antennas can be arranged in a multiple-input multiple-output (MIMO) fashion. Moreover, personal mobile universal communication gateway 110 can be arranged to have much higher transmit power and receive sensitivity than mobile station 105.

Non-volatile memory 160 includes personal content storage area 165 that stores personal content for the mobile station. This content can be used to cache desired content locally instead of the mobile station consuming more battery power and spectrum by accessing the a wide area network. This content can also be used to store frequently used content in order to minimize unnecessary battery drain and spectrum usage. Such frequently used content can include, but is not limited to, frequently accessed internet content, push e-mail, and/or shared contacts, tasks or schedules. Personal content storage 165 can also be used by an operator of the wide area network to push content towards the mobile station using broadcast or multicast techniques, such content including audio or video streams and/or audio or video on demand. Moreover, personal content storage 165 can include authorization and/or authentication information for one or more mobile stations, thereby allowing the gateway to access a wide area network without obtaining this information from the mobile station.

Personal mobile universal communication gateway 110 can also include a battery (not illustrated). This battery can have a higher capacity than the battery of mobile station 105.

Wide area network 115 can include one or more wide area networks. These wide area networks can be conventional macro networks, such as cellular networks, WiMax networks, satellite networks and/or wired networks.

Figure 2:
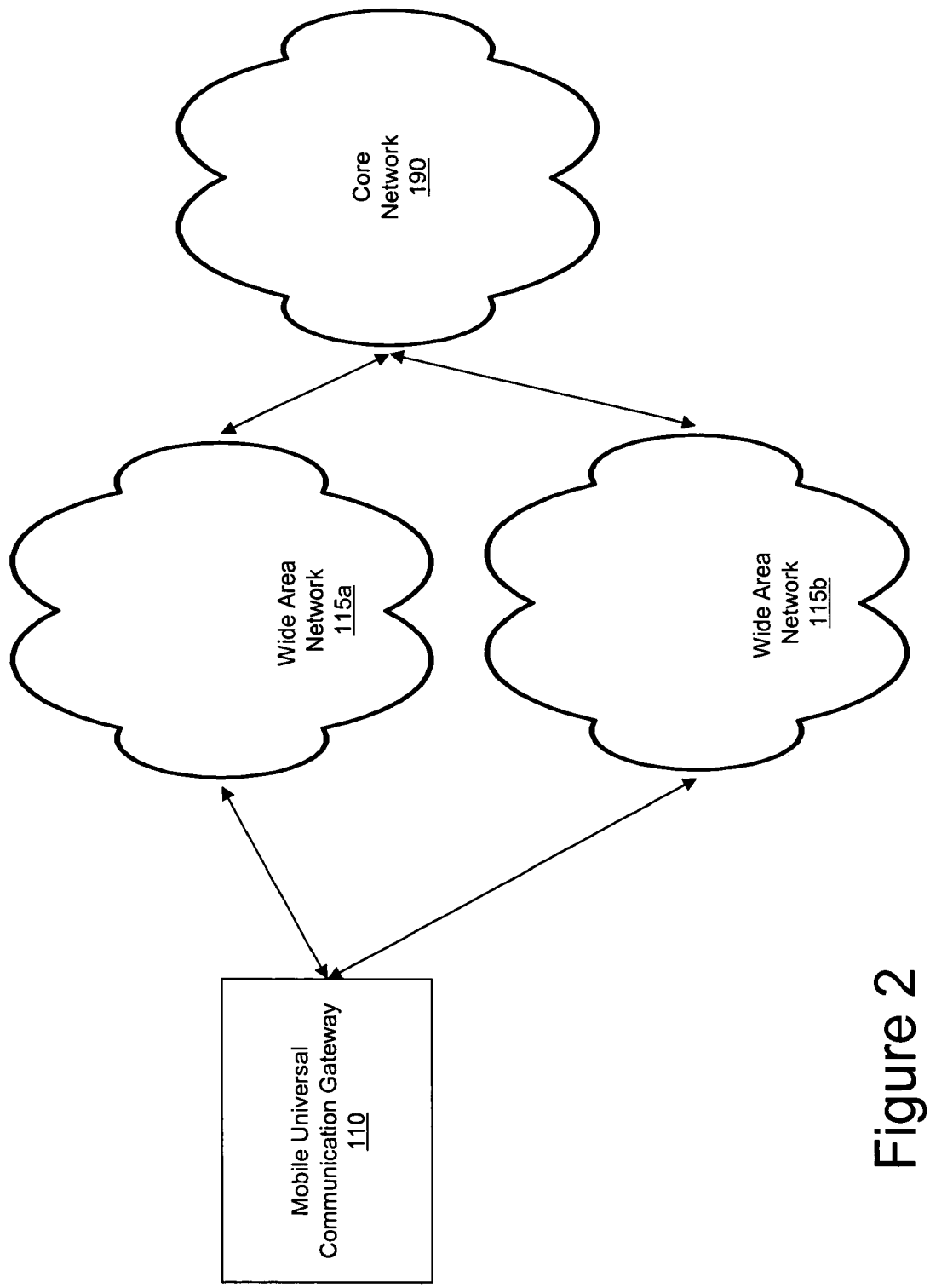
FIG. 2 is a block diagram of an exemplary system in accordance with one aspect of the present invention.

FIG. 2 is a block diagram of an exemplary system in accordance with one aspect of the present invention. As illustrated in FIG. 2, personal mobile universal communication gateway 110 may be coupled to one or more wide area networks 115a and 115b in order to communicate with core network 190. Based on the results of backhaul selection logic 150 personal mobile universal communication gateway 110 may communicate via one or more wide area networks even when the gateway can connect directly to core network 190, for example, when the access costs are less.

Figure 3A:
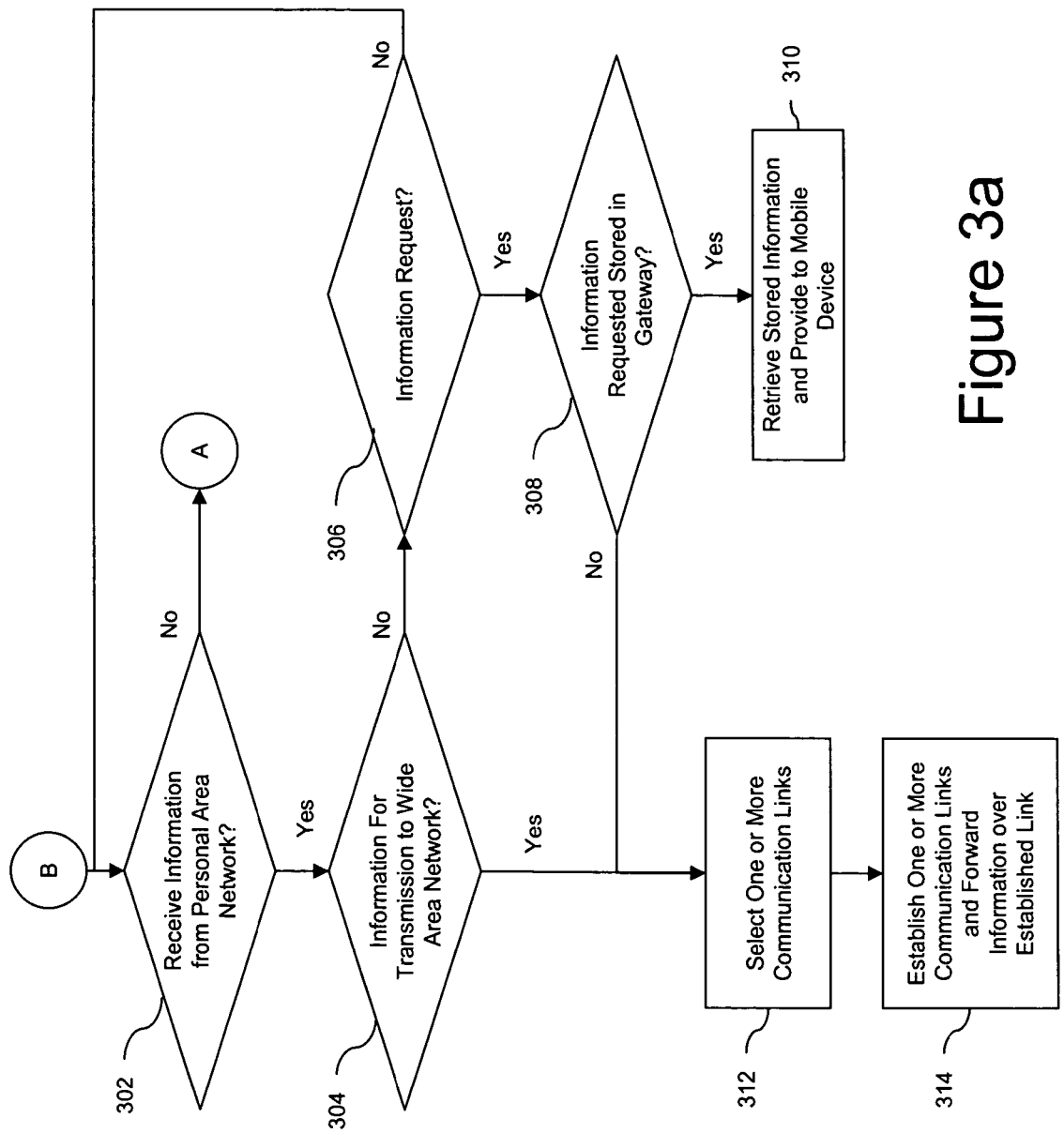
FIGS. 3a and 3b are flow diagrams of an exemplary method for a personal mobile universal communication gateway in accordance with the present invention.
Figure 3B:
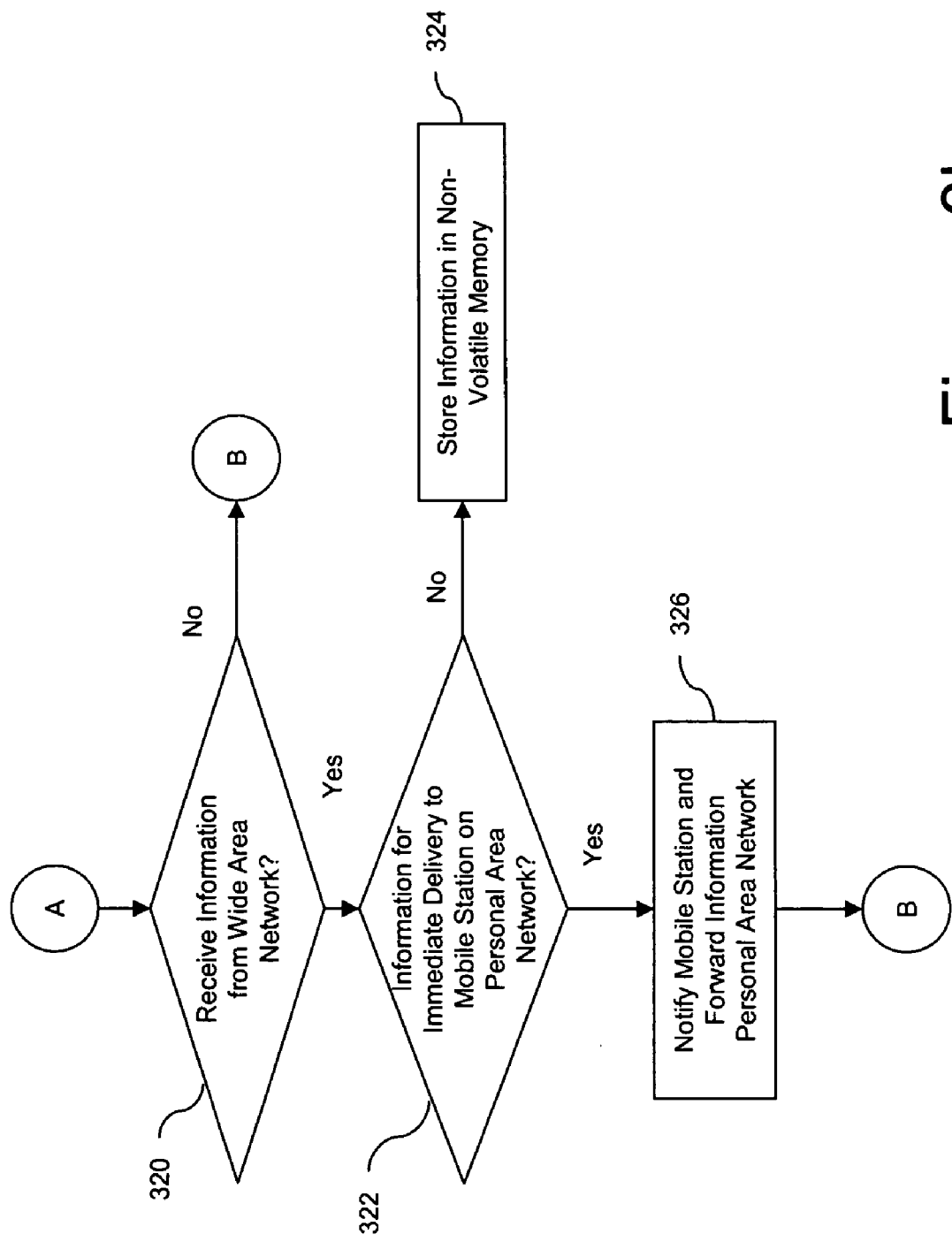

FIGS. 3a and 3b are flow diagrams of an exemplary method for a personal mobile universal communication gateway in accordance with the present invention. When the personal mobile universal communication gateway receives information from the personal area network ("Yes" path out of decision step 302), then the gateway determines whether the information is for transmission to the wide area network (step 304). When the information is not for transmission to the wide area network ("No" path out of decision step 304), then the gateway determines whether the information is an information request (step 306). When the information is not an information request ("No" path out of decision step 306), then the gateway continues to determine whether it has received information from the personal area network (step 302). When the information is an information request ("Yes" path out of decision step 306), then the gateway determines whether the requested information is stored in personal content storage 165 of the gateway (step 308). When the information is stored in personal content storage 165 of the gateway ("Yes" path out of decision step 308), then the gateway retrieves the stored information and provides it to the mobile station that requested such information (step 310).

When the gateway has not previously stored the requested information ("No" path out of decision step 308) or if the information is for transmission to the wide area network ("Yes" path out of decision step 304), then backhaul selection logic 150 selects one or more communication links (step 312), establishes the one or more selected communication links (if not already established) and forwards the information over the established links (step 314). Protocol conversion logic 152 will perform any necessary conversion of signaling and/or media protocols between the personal area network and the wide area network. The selection of one or more communication links can be based on predetermined or adaptive selection criteria including radio frequency (RF) signal strength, access cost, available bandwidth, traffic loads, data link delay/jitter and/or the like in order to optimize performance, minimize backhaul costs and reduce battery consumption (when the gateway is operating using only battery power).

When the gateway has not received information from the personal area network ("No" path out of decision step 302), then the gateway determines whether it has received information from the wide area network (step 320). When the gateway does not receive information from the wide area network ("No" path out of decision step 320), then the gateway continues to monitor the personal area network interface (step 302). If, however, the gateway does receive information from the wide area network ("Yes" path out of decision step 320), then the gateway determines whether the information is for immediate delivery to the mobile station (step 322). When the information is not for immediate delivery ("No" path out of decision step 322), then the gateway stores the information in personal content storage 165 (step 324). When the information is for immediate delivery ("Yes" path out of decision step 322), then the gateway notifies the mobile station and forwards the information over the personal area network interface (step 326). Protocol conversion logic 152 will perform any necessary signaling and/or media protocol conversion between the personal area network and wide area network. The gateway then continues to monitor the personal area network interface (step 302).

The personal mobile universal communication gateway of the present invention has many applications. One application is as a personal roaming agent. In this application when the mobile station does not have access to a wide area network (e.g., due to low receive signal strength from the wide area network), the greater transmit power and receive sensitivity of the gateway can be employed to couple the mobile station with the wide area network. Moreover, when the mobile station is in range of a wide area network with which it is not compatible (e.g., the mobile station has a CDMA capability but is only in range of a GSM network), the personal mobile universal communication gateway can allow the mobile station to access the wide area network by converting the signaling and media between the mobile station and wide area network. The wide area network can then, if necessary, provide the signaling and media to the mobile station's core network.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A mobile universal communication gateway comprising:

a personal area network interface coupled with a mobile station;

a wide area network interface coupled with a wide area network;

a battery;

a processor coupled to the personal area network and wide area network interfaces, the processor comprising backhaul selection logic, wherein the processor preprocesses information for the mobile station, the preprocessing including video and audio decoding, and the personal area network interface provides decoded video and audio to the mobile station;

volatile memory coupled to the processor; and non-volatile memory coupled to the processor, wherein the non-volatile memory stores multi-media information for the mobile station, wherein the backhaul selection logic selects two backhaul communication links to at least two wide area networks for concurrently communicating information received from the mobile station to the at least two wide area networks.

2. The mobile universal communication gateway of claim 1, wherein the at least two wide area networks forward the information received from the mobile universal communication gateway to a wireless core network.

3. A method for a mobile universal communication gateway, the method comprising the acts of:

receiving a communication setup request from a mobile station supported by a personal area network;

selecting at least two wide area networks based on a type of communication requested by the communication setup request and adaptive selection criteria that account for performance, minimize backhaul costs and reduce battery consumption;

establishing a communication link with the selected at least two wide area networks.

4. The method of claim 3, wherein each of the at least two wide area networks operate according to a different communication technology.

5. The method of claim 3, wherein one of the at least two wide area networks is a wireless network.

6. The method of claim 3, wherein one of the at least two wide area networks is a wired network.

7. The method of claim 3, wherein the communication setup request is received over a licensed frequency band.

8. The method of claim 3, wherein the communication setup request is received over an unlicensed frequency band.

* * * * *